US009364119B2

(12) United States Patent
Versteylen et al.

(10) Patent No.: US 9,364,119 B2
(45) Date of Patent: *Jun. 14, 2016

(54) ABSORBENT PAD TO PRESERVE FRESHNESS FOR CONSUMER FOOD STORAGE

(75) Inventors: Sayandro Versteylen, Ontario, CA (US);
Ronald Jensen, Chicago, IL (US);
Lindsay A. Riehle, Beaumont, CA (US)

(73) Assignee: Paper-Pak Industries, Laverne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/558,434

(22) Filed: Sep. 11, 2009

(65) Prior Publication Data

US 2010/0047405 A1 Feb. 25, 2010

Related U.S. Application Data

(63) Continuation-in-part of application No. 11/807,138, filed on May 25, 2007, and a continuation-in-part of application No. PCT/US2008/002323, filed on Feb. 21, 2008, and a continuation-in-part of application No. PCT/US2009/036442, filed on Mar. 7, 2009.

(Continued)

(51) Int. Cl.
*B65D 81/26* (2006.01)
*A47J 47/10* (2006.01)
(Continued)

(52) U.S. Cl.
CPC ............. *A47J 47/10* (2013.01); *B65D 81/264* (2013.01); *A23L 3/3427* (2013.01); *A23L 3/3436* (2013.01); *Y02C 10/08* (2013.01)

(58) Field of Classification Search
CPC ..... A47J 47/10; A23L 3/3427; A23L 3/3426; B65D 81/264; B65D 81/26; B65D 81/24; B65D 81/28
USPC ......... 426/432, 133, 110, 143, 124, 316, 326, 426/396; 206/204
See application file for complete search history.

(56) References Cited

U.S. PATENT DOCUMENTS 3,101,864 A 8/1963 Glickman
3,155,303 A 11/1964 Fenkel
3,575,287 A 4/1971 Graveley .................... 206/204
(Continued)

FOREIGN PATENT DOCUMENTS

WO WO 9426621 A1 11/1994
WO WO 2006078868 A2 7/2006
WO WO 2007067240 A1 6/2007

OTHER PUBLICATIONS

Merriam Webster Dictionary, availble at http://www.merriam-webster.com/dictionary/breaking, accessed on Sep. 23, 2011.*

(Continued)

*Primary Examiner* — Michele L Jacobson
*Assistant Examiner* — Walter Moore
(74) *Attorney, Agent, or Firm* — Ohlandt, Greeley, Ruggiero & Perle, LLP (57) ABSTRACT

The present disclosure is directed to an absorbent pad having an active agent to preserve food products or other perishable merchandise, that has a pad architecture, including the specific arrangement of the absorbent layers and active agents in the absorbent pad, that affects the availability and timing of release of the active agents to preserve the freshness of food products that are stored at home by a consumer in the consumer's own food storage containers.

11 Claims, 8 Drawing Sheets

Related U.S. Application Data (60) Provisional application No. 60/890,968, filed on Feb. 21, 2007, provisional application No. 61/034,751, filed on Mar. 7, 2008.

(51) Int. Cl.
 *A23L 3/3427* (2006.01)
 *A23L 3/3436* (2006.01)

(56) References Cited

U.S. PATENT DOCUMENTS

| | | | |
|---|---|---|---|
| 4,275,811 A | 6/1981 | Miller | 206/204 |
| 4,332,845 A | 6/1982 | Nawata et al. | 428/35 |
| 4,551,377 A | 11/1985 | Elves et al. | 428/137 |
| 4,589,876 A | 5/1986 | Van Tilburg | 604/385.04 |
| 4,856,650 A | 8/1989 | Inoue | 206/204 |
| 4,860,887 A | 8/1989 | Fosse | |
| 4,935,276 A | 6/1990 | Pawlowski et al. | 428/35.7 |
| 4,935,282 A | 6/1990 | Pawlowski et al. | 428/121 |
| 5,044,776 A | 9/1991 | Schramer et al. | |
| 5,046,604 A | 9/1991 | Forhetz et al. | 206/0.5 |
| 5,154,960 A | 10/1992 | Mucci et al. | 428/283 |
| 5,320,895 A | 6/1994 | Larsonneur et al. | 428/137 |
| 5,436,067 A | 7/1995 | Hanamoto et al. | 428/283 |
| 5,468,447 A | 11/1995 | Bermas | 422/5 |
| 5,492,705 A | 2/1996 | Porchia et al. | 426/106 |
| 5,839,572 A | 11/1998 | Yeager | 206/204 |
| 5,945,152 A | 8/1999 | Purser | 426/646 |
| 6,062,411 A | 5/2000 | Garland | |
| 6,139,935 A | 10/2000 | Cullen et al. | |
| 6,156,020 A | 12/2000 | Roe et al. | 604/385.01 |
| 6,298,983 B1 | 10/2001 | Yeager | |
| 6,376,034 B1 | 4/2002 | Brander | 428/35.7 |
| 6,478,147 B1 | 11/2002 | Brander et al. | 206/204 |
| 6,579,595 B2 | 6/2003 | Lemaire | 428/174 |
| 6,592,919 B1 | 7/2003 | Matthews et al. | 426/124 |
| 6,695,138 B1 | 2/2004 | Colombo et al. | 426/124 |
| 6,713,152 B2 | 3/2004 | Chen et al. | 428/35.2 |
| 6,823,774 B2 | 11/2004 | Uranaka et al. | 99/467 |
| 6,890,373 B2 | 5/2005 | Nemoto et al. | 95/90 |
| 6,926,862 B2 | 8/2005 | Fontenot et al. | 422/50 |
| 6,936,342 B2 | 8/2005 | Shibata et al. | 428/304.4 |
| 6,966,436 B2 | 11/2005 | Baldwin et al. | 206/204 |
| 6,979,485 B2 | 12/2005 | Price et al. | 428/137 |
| 6,986,931 B2 | 1/2006 | Ackerman et al. | 428/137 |
| 6,991,844 B2 | 1/2006 | LeBoeuf et al. | 428/137 |
| 7,022,395 B2 | 4/2006 | Ackerman et al. | 428/137 |
| 7,026,034 B2 | 4/2006 | LeBoeuf et al. | 428/131 |
| 7,056,569 B2 | 6/2006 | Price et al. | 428/137 |
| 7,063,879 B2 | 6/2006 | Trent et al. | 428/137 |
| 7,063,880 B2 | 6/2006 | Karul | 428/143 |
| 7,078,088 B2 | 7/2006 | Price et al. | 428/137 |
| 7,165,306 B2 | 1/2007 | Bezek et al. | 29/453 |
| 7,189,666 B2 | 3/2007 | Finnegan et al. | 442/153 |
| 7,306,094 B2 | 12/2007 | Baldwin et al. | 206/204 |
| 2001/0031298 A1* | 10/2001 | Fuller | 426/419 |
| 2002/0175218 A1 | 11/2002 | Uranaka et al. | |
| 2003/0049410 A1 | 3/2003 | Munagavalasa et al. | 428/137 |
| 2003/0076582 A1 | 4/2003 | Phillips et al. | |
| 2003/0118758 A1 | 6/2003 | Chen et al. | |
| 2003/0153457 A1 | 8/2003 | Nemoto et al. | |
| 2004/0131736 A1 | 7/2004 | Pan et al. | 53/474 |
| 2004/0224101 A1 | 11/2004 | Johnson | |
| 2004/0247750 A1* | 12/2004 | Finnegan et al. | 426/107 |
| 2004/0267223 A1* | 12/2004 | Etchells | 604/385.01 |
| 2005/0008737 A1 | 1/2005 | Kwon | 426/124 |
| 2005/0082304 A1 | 4/2005 | Bezek et al. | |
| 2005/0191462 A1 | 9/2005 | Baldwin et al. | |
| 2006/0006076 A1 | 1/2006 | Retzner | 206/204 |
| 2006/0029771 A1 | 2/2006 | O'Neill et al. | 162/114 |
| 2006/0093788 A1 | 5/2006 | Behm et al. | 428/137 |
| 2006/0144811 A1 | 7/2006 | Cheng | 206/527 |
| 2006/0172048 A1 | 8/2006 | Etchells et al. | 426/426 |
| 2007/0048415 A1* | 3/2007 | Etchells et al. | 426/235 |
| 2007/0202220 A1 | 8/2007 | Dicosola | |
| 2007/0212968 A1 | 9/2007 | Beu et al. | 442/59 |

OTHER PUBLICATIONS

Oxford English Dictionary, Second Edition, No month, 1989, available at: http//www.oed.com/oed2/00163302; accessed on Sep. 23, 2011.

International Search Report dated May 20, 2008 from corresponding International Application PCT/US2008/002323.

International Search Report dated Apr. 29, 2009 from International Application No. PCT/US2009/036442.

* cited by examiner

ABSORBENT PAD TO PRESERVE FRESHNESS FOR CONSUMER FOOD STORAGE

CROSS-REFERENCE TO RELATED APPLICATIONS

This application is a continuation-in-part application of U.S. patent application Ser. No. 11/807,138, filed on May 25, 2007, which claims benefit of U.S. Provisional Application No. 60/890,968, filed on Feb. 21, 2007; a continuation-in-part application of International Application No. PCT/US2008/002323, filed on Feb. 21, 2008, which claims benefit of U.S. Provisional Application No. 60/890,968, filed on Feb. 21, 2007; and a continuation-in-part application of International Application No. PCT/US2009/36442, filed on Mar. 7, 2009, which claims benefit of U.S. Provisional Application No. 61/034,751, filed on Mar. 7, 2008, all of which are herein incorporated by reference.

BACKGROUND OF THE DISCLOSURE

1. Field of the Disclosure

The present disclosure is directed to an absorbent pad having an active agent to preserve the freshness of food products or other perishable merchandise, that is structured for use by a consumer to be placed in an enclosed environment, such as a consumer food storage container.

2. Description of the Related Art

Absorbent pads are used in the retail food packaging industry to absorb excess moisture and fluids exuded from meat, poultry, seafood, and produce, to provide a safer, more appealing product to place on the grocery store shelf or cooler for sale to the public.

A typical retail food package has a thin foam tray or pallet on which an absorbent pad is placed. The food is placed on the absorbent pad, and then the tray, absorbent pad, and food are overwrapped with a piece of thin, clear film that is stretched over the open top of the tray to completely enclose the food. The plastic film is sealed to the tray by adhesive or by a brief application of heat to the edges of the plastic film. The absorbent pad may contain an active agent that enhances the safety, shelf life, and aesthetics of the packaged food. The typical retail food package provides a convenient, self-contained package so that a consumer can pick up and inspect the food package without directly contacting the food, and can bring it home.

However, the typical retail food package described above is generally for a single use only. When the consumer brings the food package home and removes the food product, the stretchable film overwrap is removed or cut away from the tray. After the food is removed from the tray, the film overwrap is discarded, and usually the tray and the absorbent pad from the retail food package are discarded as well.

For convenience and economy, grocery stores and meat stores often package multiple servings of food products in a single retail package. After discarding the retail food package at home, the consumer may wish to repackage the food into smaller portion sizes for later use. For example, a consumer may buy a retail food package from a grocery store that contains three (3) pounds of ground sirloin. Once at home, the consumer may divide the ground sirloin into three (3) separate one-pound portions, placing one pound in the refrigerator to be cooked later that same day, and re-packaging the other portions into two one-pound packages. This may be done by wrapping the food in freezer wrap, placing the food inside of a household food storage container or in a flexible plastic food storage bag, which are then placed in the consumer's refrigerator or freezer.

Depending on the food product, a consumer may place a portion of the food directly in a refrigerator crisper drawer, or on a dish that is placed on a refrigerator shelf. If the food product does not require refrigeration, the unused portions may be placed directly in a closed food storage bin, such as a bread bin, or on a pantry shelf.

However, consumers bringing food products home from the store to repackage into more-convenient serving sizes rarely transfer the absorbent pad from the retail food package into the consumer's food storage containers at home. The absorbent pad may appear to be saturated or expended with fluids exuded from the food product and, if the absorbent pad contained any active agents to enhance freshness, the active agents may already be "used up." In addition, meat and produce purchased at the counter of a meat store or butcher shop often is simply wrapped in paper without a separate absorbent pad that could be transferred into a consumer food storage container.

Consequently, when a consumer brings home a food product in a retail food package, and repackages the food in a food storage container or new, there is no absorbent pad placed in the container, refrigerator, drawer, or bin to absorb fluids exuded from the food, nor active agents that inhibit microbial growth or modify the atmosphere enclosed in the consumer's storage container to preserve freshness. Similarly, after a meal, a consumer may place the leftovers in a food storage container, but has no absorbent pad to place therein. The result is that the food may quickly lose its freshness or aesthetic appeal before the consumer is ready to cook or eat the food. This leads to consumers discarding food before use, thereby wasting food and money.

An absorbent pad for use in a retail food package is placed in an environment in which the food package is closed and sealed a single time, which is at the time of the initial packaging, and can be structured accordingly. However, a consumer food storage container may be opened and closed several times by the consumer, to take food out or to place food in the storage container or bin, temporarily exposing the interior environment of the food storage container to ambient conditions.

The same conditions and issues described above for food can arise with non-edible, but perishable, merchandise, such as fresh flowers.

Therefore, there exists a need for an absorbent pad having an active agent to preserve the freshness of food products or other perishable merchandise, that is structured for use by a consumer at home.

SUMMARY OF THE INVENTION

The present disclosure provides an absorbent pad having an active agent to preserve freshness, and enhance food safety and appearance of a food product when placed in an enclosed, controlled environment, including a consumer food storage container such as a container with a cover, sealable bag, refrigerator, freezer, food storage drawer, cooler, crisper, or closeable food storage bin. The absorbent pad has an architecture that is structured to control the release profile of an active agent therein.

The absorbent pad of the present disclosure may also be used to preserve non-edible perishable merchandise, such as flowers, in a consumer's home.

The specific architecture and structure of an absorbent pad, including the type and quantity of absorbent layers, top and bottom layers, and placement of active agents in the absorbent pad in relation to the absorbent layers, controls the activity and availability of the active agents to preserve and enhance freshness of food products in an enclosed environment.

Active agents used in an absorbent pad of the present disclosure include, but are not limited to, one or more carbon dioxide generators, oxygen scavengers, ethylene scavengers and/or antimicrobials.

Absorbent pads of the present disclosure have an absorbent medium body that may be made of one or more absorbent layers, such as tissue layers. The absorbent layers may be arranged to form pockets or compartments in the absorbent pad to hold active agents, to control the availability and timing of release of an active agent in a consumer food storage container.

The consumer food storage container in which the absorbent pad made be placed can be a rigid structure having a base or bottom, side walls that form an opening, and a preformed cover fitted to the opening that can be opened and closed to permit ingress and egress of food in the container by the consumer. Alternatively, the consumer food storage container can be a flexible plastic bag that can be opened and closed to permit ingress and egress of food in the bag.

The absorbent pad can be structured so that an active agent is available to regenerate the environment in a food storage container favorable to food preservation after the consumer food storage container has been opened and re-closed to add or remove food.

The absorbent pad of the present disclosure may be secured to the consumer food storage container, or may be unattached to the container and simply placed therein. The securing device can be on the absorbent pad or on the consumer food storage container.

A method for using the absorbent pad of the present disclosure in an enclosed environment, such as a consumer food storage container, to preserve the freshness of a food product is also provided.

DETAILED DESCRIPTION OF THE INVENTION

The present disclosure is a food storage package for consumers that maintains a hygienic environment to preserve the freshness of food, and to maintain a better quality of appearance, smell, and taste of food for a longer period of time than currently available.

Figure 1:
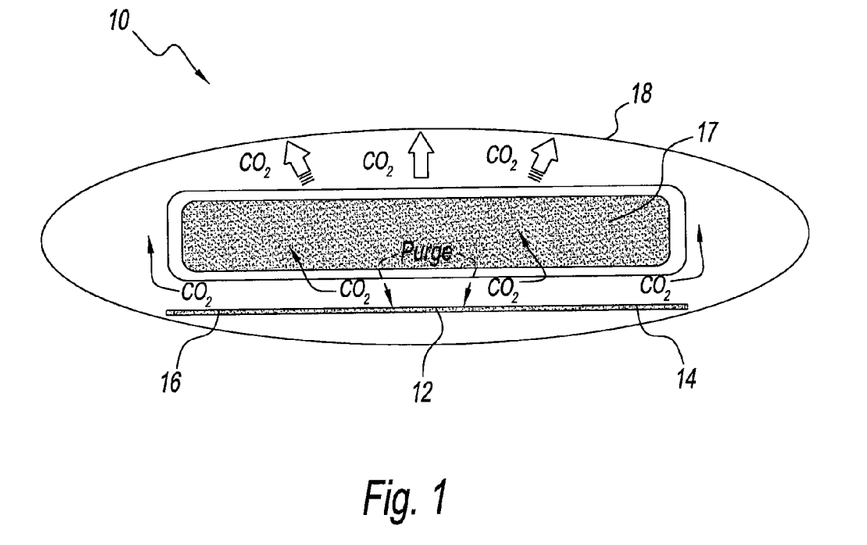
FIG. 1 is an illustration of antimicrobiological packaging of food products with an absorbent pad of the present disclosure having active agents.

Referring to the drawings, and in particular, FIG. 1, there is provided an illustration of an overall system represented by reference number 10 to preserve freshness of food products in a consumer storage container according to the present disclosure.

An absorbent pad 12 of the present disclosure is positioned underneath food product 17. Absorbent pad 12 soaks up liquid purge from food product 17 that would otherwise collect on the bottom of consumer food storage container or bag 18 that encloses food product 17 and absorbent pad 12. Absorbent pad 12 contains one or more active agent 14, 16 that can be an antimicrobial 14 and/or an atmosphere modification system or atmosphere modifying agent 16.

As illustrated in FIG. 1, liquid purge exuded from food product 17 is absorbed into absorbent pad 12, thereby activating the active agents; i.e., antimicrobial 14 and/or an atmosphere modifying system 16, which is shown in FIG. 1 as a $CO_2$ generation system. As the liquid purge is absorbed into absorbent pad 12, the components of the $CO_2$ generation system dissolve to react with each other to release $CO_2$ within the enclosed space of consumer storage container 18. Although not illustrated in FIG. 1, atmosphere modifying agent 16 can also be an oxygen ($O_2$) scavenger, such as an enzymatic $O_2$ scavenger, or an ethylene scavenger, that is activated by liquid purge in absorbent pad 12. In addition, as liquid purge contacts antimicrobial 14, antimicrobial 14 is dissolved, and inhibits bacterial growth in the liquid purge.

Figure 2:
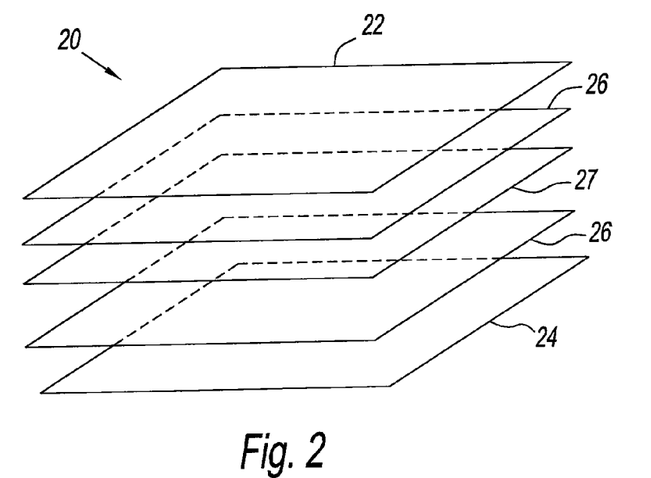
FIG. 2 is an illustration of pad architecture of an exemplary embodiment of an absorbent pad of the present disclosure.

Referring to FIG. 2, one exemplary absorbent pad or pad architecture 20 has a top layer 22 and a bottom layer 24 separated by one or more layers or tissue layers 26 of an absorbent material. The absorbent material absorbs liquid purge from the food product. Each tissue layer 26 itself can be formed of one or more tissues that are joined together to form the tissue layer.

As used in this application, the "architecture" of an absorbent pad means the structure and order of individual layers of absorbent material and active agents therein.

As used herein, a "consumer food storage container" can be any enclosed, controlled environment that prevents passage of normal atmospheric air to a food product therein, but selectively provides access to the food product for selected removal of the food product. Examples of a consumer food storage container include, but are not limited to, a container having a cover, a sealable bag, a refrigerator, a freezer, a cooler, a food storage drawer, a crisper, and a closeable food storage bin.

The architecture of absorbent pad 20 affects the performance of the packaging for preservation of food; that is, performance depends not only on the active agents used, but where the active agents are placed in the absorbent pad in relation to the absorbent tissue layers 26 and top and bottom layers 22,24. As will be illustrated by several exemplary embodiments in this application, active agents, or even the individual components that make up an active system (such as the individual chemical components of a $CO_2$ generation system) can be separated by absorbent tissue layers 26 in the structure of absorbent pad 20, such that there is an immediate release or "burst" of $CO_2$ in the consumer food storage container, and also a delayed release or "burst" of $CO_2$ at a later time, when a different pocket of $CO_2$-generating components is activated by contact with liquid purge. The separate bursts of $CO_2$ levels in the container help to preserve and extend food freshness, enhance food safety and appearance, and reduce food wastage.

The architecture of absorbent pad 20 can be selected to control the availability and activity of one or more active agent in the absorbent pad when placed in a consumer food storage container. For example, a consumer food storage container, unlike a retail food package, may be opened and closed several times by the consumer to add or remove food, thereby re-introducing the ambient environment into the interior of the container. Absorbent pad 20, having one or more active agents positioned in separate pockets or in different layers of the pad architecture, possesses the capability for unexpended active agents to be activated once the consumer food storage container is closed, and regenerate an environment in the container that will be favorable to preserve freshness of food, as well as enhance food safety and appearance.

The arrangement (or structure) of the two or more tissue layers 26 can form a pocket or a compartment within absorbent pad 20. A pocket means an area between two layers that can hold in place an active agent prior to use of the absorbent pad. A pocket can be an area between two adjacent tissue layers 26, between a top layer 22 and adjacent tissue layer 26, and/or between a bottom layer 24 and adjacent tissue layer 26.

In FIG. 2, active agents 27 are positioned in a pocket formed between two separate tissue layers 26, and can be located on, in, or in-between tissue layers 26 that form the pocket. In this embodiment, a food product would be placed in contact with top layer 22, and uptake of liquid purge from the food product would be substantially through bottom layer 24. Top layer 22 can be a film, such as polyethylene, polypropylene, polyester, or a non-woven material, and, in this exemplary embodiment, is polyethylene. Tissue layers 26 are any absorbent material that can absorb a large quantity of liquid purge from a food product, such as (but not limited to) fluff pulp, cellulose, or airlaid. Bottom layer 24 can be a non-woven material or a film, and in this exemplary embodiment, is a non-woven material.

Absorbent pad 20 has an absorbent medium or superabsorbent medium. The absorbent medium or superabsorbent medium may be a material such as fluff pulp, cellulosic material, binding fiber, airlaid, nonwoven, woven, polymer, absorbent gels, superabsorbent polymer (SAP), compressed SAP composite of SAP granules adhered with one or more binders or plasticizers, airlaid with SAP, compressed composite with short or microfiber materials, thermoplastic polymer fibers, cellulose powders, and combinations thereof. The non-woven material may be spun-bonded polypropylene or perforated plastic film. The absorbent or superabsorbent medium is made of one or more materials that provide a nominal absorbency of about 5 parts per million (0.0005 wt %) to about 50,000 parts per million (5 wt %), where nominal absorbency is defined as the weight of the fluid exuded from the food that can be absorbed by the absorbent pad. Nominal absorbency for absorbent pads are typically about 50 grams to 75 grams.

Absorbent pad 20 may have a top layer or bottom layer that is manufactured or treated to have a non-slip surface (i.e., with a coefficient of friction greater than 1.0). Co-pending U.S. patent application Ser. No. 11/507,724 describes absorbent pads having a non-slip top layer and/or bottom layer that may be used in the present disclosure, and is incorporated herein by reference.

Absorbent pad 20 has active agents 27 that are an antimicrobial agent and a $CO_2$ generation system. An example of an antimicrobial agent in absorbent pad 20 is a mixture of citric acid and sorbic acid. However, any food-safe antimicrobial can be employed, including other organic acids, quaternary ammonium compounds, and any combinations of such antimicrobials. An example of a $CO_2$ generation system for absorbent pad 20 is a mixture of an acid and a base, such as citric acid and sodium bicarbonate, respectively. In this exemplary embodiment, active agents 27 are both positioned in the pocket formed between two tissue layers 26.

The ratio of the amounts of citric acid to sorbic acid in the antimicrobial affects performance as an inhibitor of bacterial growth in purge. Consistent inhibition of bacterial growth in a liquid purge can be obtained with a ratio of 7:3 of citric acid:sorbic acid. In addition, total amounts of the antimicrobial agent are advantageously scaled to the total absorbency of the absorbent pad 20. For example, absorbent pad 20 with absorbent tissue layers 26 that can absorb 50 grams of liquid purge can hold about 1 gram total of a mixture of citric acid and sorbic acid (at a 7:3 ratio, that is 0.7 g of citric acid and 0.3 g of sorbic acid), which is about 2 weight-% (wt %) of the nominal absorbency of the absorbent pad, for consistent inhibition of bacterial growth in the liquid purge.

The word "about," as used herein for dimensions, weights, or measures of absorbency, means a range that is ±10% of the stated value, more preferably ±5% of the stated value, and most preferably ±1% of the stated value, including all sub-ranges therebetween.

For the $CO_2$ generation system, a mixture of citric acid and sodium bicarbonate can be employed. The ratio of citric acid to sodium bicarbonate is one factor (with the primary factors being the architecture of the absorbent pad and the placement and type of the active agent in the absorbent pad) that affects the amount of $CO_2$ released within the food package. In this exemplary embodiment, a ratio of about 4:6 (citric acid:sodium bicarbonate) can be employed to release sufficient $CO_2$ for food preservation. However, other ratios may be selected based on other factors, such as the $pK_a$ of the acid selected.

The citric acid used as an active agent in the $CO_2$ generation system provides an additional beneficial function, by interacting with the sodium ion of sodium bicarbonate to create a citric acid/sodium citrate system acting as a buffer to maintain the pH within food-compatible ranges within the food package. The citric acid-citrate buffer system is also beneficial in absorbent pads having an $O_2$ scavenger as an atmosphere modifier, as excessively low pH can inactivate certain $O_2$ scavengers.

In the exemplary embodiment in FIG. 2, all active agents 27 are contained in one pocket formed between two tissue layers 26. This pad architecture provides a burst of $CO_2$ generation as the chemicals are activated by the liquid purge. Although the pad architecture in FIG. 2 is suitable for preserving any type of food product that may be stored in a consumer storage container, this particular pad architecture is well-suited to preserve freshness of beef, poultry, and pork.

Scaling, or selecting, the proper amounts of active agents to employ in the absorbent pad starts with the amount of absorbent material, as well as the type of food product in the container and the amount of liquid purge generated therefrom. If an absorbent pad architecture employs too much absorbent material relative to the amount of liquid purge from the food, then there will be insufficient liquid to dissolve the active agents to initiate activity. On the other hand, if the absorbent pad employs too little absorbent material, then liquid purge can "drown" or dilute the active agents and thereby impair their effectiveness. In addition, active agents placed in absorbent pads can themselves reduce the absorbency of the absorbent pad. Scaling the amounts and ratios of active agents in relation to the amount of absorbent material in the absorbent pads of this disclosure has a beneficial effect on preserving foods in consumer food storage containers.

Figure 3:
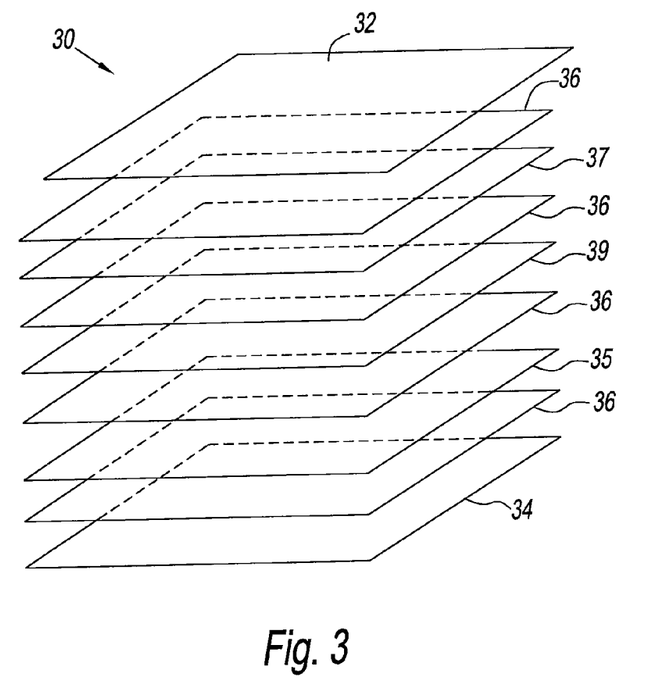
FIG. 3 is an illustration of pad architecture of another exemplary embodiment of an absorbent pad of the present disclosure.

Referring to the pad architecture of absorbent pad of FIG. 3, absorbent pad 30 has two or more separate pockets formed between tissue layers into which active agents are placed. Absorbent pad 30 has top layer 32 and bottom layer 34 that are separated by two or more tissue layers 36. Each tissue layer 36 can be formed of one or more tissues that are joined together to form the tissue layer. Preferably, as shown in the embodiment in FIG. 3, there are four separate tissue layers 36. Active agents 35 and 37 are positioned in the pockets formed between a pair of two separate tissue layers 36. In addition, a superabsorbent material 39 can be placed in between two tissue layers 36. Superabsorbent material 39 is a membrane that provides a delayed activation of a second pocket of active agents 37. Examples of superabsorbent material 39 include, but are not limited to, superabsorbent polymers such as polyacrylate (and its laminates with cellulose, airlaids or nonwovens). Alternatively, layer 39 can be a non-woven, such as polyethylene.

In the exemplary embodiment of absorbent pad 30, active agent 37 is in a first pocket between a first tissue layer 36 and a second, separate tissue layer 36, and is a $CO_2$ generation system or a component thereof. As shown in FIG. 3, a second active agent 35 is in a second pocket between a third tissue layer 36 and a fourth tissue layer 36, and is a $CO_2$ generation system and an antimicrobial agent.

The liquid purge, which is absorbed into the absorbent layers of absorbent pad 30 through bottom layer 34, is absorbed in fourth tissue layer 36 and then contacts active agent(s) 35. This contact activates active agent 35, and provides a bacteriostatic effect on microbes in the purge. The amounts of antimicrobials present in active agent 35 are scaled to the absorbency of exemplary absorbent pad 30 at a 1 wt % to 2 wt % level, based on a nominal absorbency of the absorbent pad 30 (i.e., if the absorbent pad can absorb a total of about fifty (50) grams of purge, and the antimicrobial agent(s) are present in a total amount of about 0.5 grams, this equates to about 1 wt % of antimicrobial agent based on a nominal absorbency of the absorbent pad). In other embodiments of absorbent pad 30, the antimicrobial can be present in an amount between 1 wt % to 3 wt % based on a nominal absorbency of the absorbent pad.

As liquid purge soaks upward through absorbent pad 30, the purge is absorbed by the third tissue layer 36 and then by superabsorbent 39, which delays passage of the liquid purge before the purge is absorbed into the second tissue layer 36 and eventually the second pocket containing active agent(s) 37. When active agent 37 (which, in this embodiment, is one of the components for a $CO_2$ generation system) is activated by liquid from the absorbed purge and/or dissolved reagents of active agent 35, producing a delayed burst of $CO_2$ into the consumer food storage container, thereby regenerating an environment in the container that enhances food preservation and safety.

As a particular example of amounts used for active agents, for a fifty (50) gram absorbent pad, a total of about five (5) grams of a $CO_2$ generation system can be used to provide sufficient levels of $CO_2$ in the consumer food storage container to enhance food preservation. Also, some food products, particularly poultry, have a natural porosity that can absorb some of the $CO_2$. Absorbent pads 30 of this embodiment also provide a delayed release of $CO_2$, which is particularly beneficial for a food product, such as poultry, that can be preserved in a consumer storage container for a longer time as compared with other pad architectures where the $CO_2$ generation system is completely expended after initial activation. Five (5) grams of a $CO_2$ generation system can generate about one thousand (1000) cc's of $CO_2$ in the consumer container, until the limiting active component is expended.

The chemical components of the $CO_2$ generation system (such as citric acid and sodium bicarbonate) can be divided among multiple pockets that are formed by tissue layers 36, such that sodium bicarbonate ($NaHCO_3$) is available to react in stages, effectively making $NaHCO_3$ the limiting reagent for the $CO_2$ generation system. For example, using the example where five (5) grams of the $CO_2$ generating chemicals are used, 1.5 grams of $NaHCO_3$ can be positioned as active agent 37 (i.e., in the upper/first pocket) of absorbent pad 30, while the remaining 3.5 grams of the $CO_2$ generation system (about 1.5 grams of sodium bicarbonate and about 2 grams of citric acid) are positioned between tissue layers as active agent 35 (i.e., in the lower/second pocket). The lower compartment also contains most or all of the antimicrobial, for example, 0.7 grams of citric acid and 0.3 grams of sorbic acid, which is a total of 1 gram (2 wt %) of an antimicrobial. All absorbent capacity from the lower tissue layers 36 will be exhausted before the purge soaks into the upper pocket to activate the remaining $CO_2$ generating chemicals. These stages of $CO_2$ release allow for a large amount of $CO_2$ to reach equilibrium inside the consumer food storage container, and enough gas to be dissolved onto the surface of the meat, while providing sufficient $CO_2$ at a later time to regenerate the environment in the container to preserve freshness.

Figure 4:
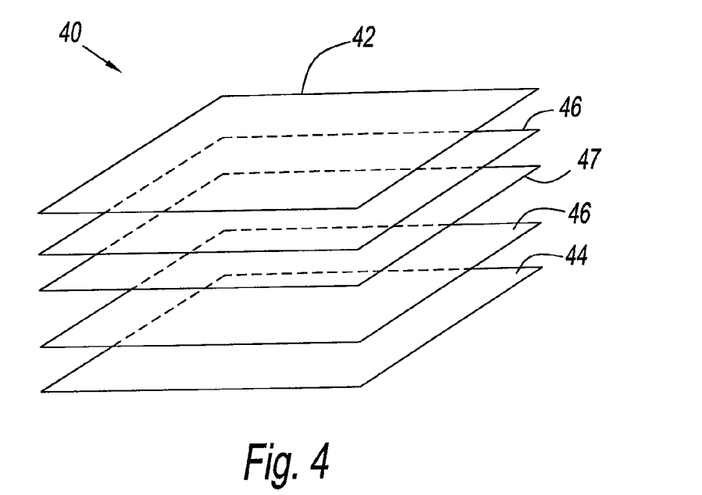
FIG. 4 is an illustration of pad architecture of another exemplary embodiment of an absorbent pad of the present disclosure.
Figure 5:
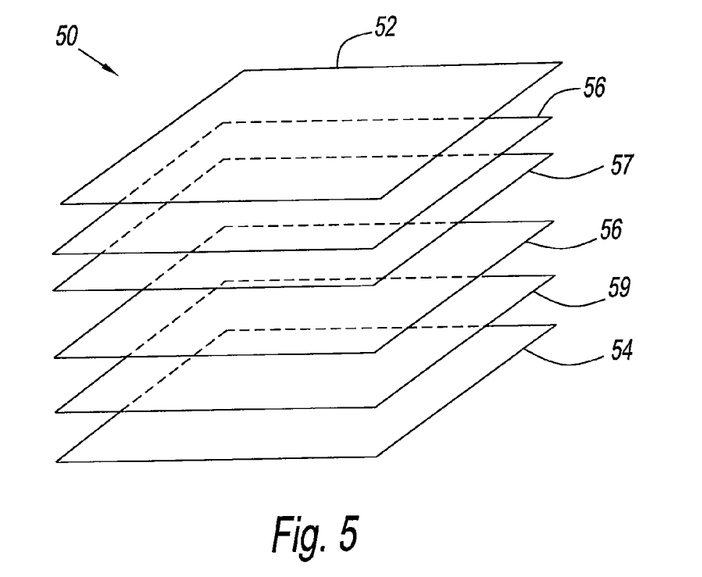
FIG. 5 is an illustration of pad architecture of another exemplary embodiment of an absorbent pad of the present disclosure.

FIGS. 4 and 5 illustrate the architectures of two other exemplary embodiments of the architectures for absorbent pads 40 and 50, respectively, which have active agents that include oxygen scavenging agents. Absorbent pads 40 and 50 can be used for any food products, but the pad architectures are well-suited for preservation of beef, poultry and pork.

Referring to FIG. 4, absorbent pad 40 has top layer 42 and bottom layer 44 that are separated by two or more layers of absorbent tissue 46. Absorbent pad 40 has a single pocket formed between two separate, adjacent tissue layers 46. Each tissue layer 46 can be formed of one or more tissues that are joined together to form the tissue layer. Active agent 47, in this exemplary embodiment, is one or more oxygen scavengers positioned between two tissue layers 46. A food product would be placed in contact with top layer 42, and uptake of liquid purge from the food product is through bottom layer 44. Top layer 42 can be a film, such as polyethylene, polypropylene, polyester, or a non-woven material, and, in this exemplary embodiment, is polyethylene. Bottom layer 44 can be a non-woven material or a film, and in this exemplary embodiment, is a non-woven material.

Oxygen scavengers that can be used in absorbent pad 40 include oxygen scavenging enzyme systems, such as oxidase (including glucose oxidase and hexose oxidase), oxygenase, peroxidase, oxidoreductase, invertase, amylase, catalase, and maltase, or combinations thereof.

Active agent 47 can also include both an oxygen scavenger and a $CO_2$ generation system. The oxygen scavenger is activated by a liquid, such as water, and so does not lose its effectiveness (i.e., become "spent") through contact with ambient air before activation by purge, which is a benefit.

An antimicrobial can be added as an active agent in absorbent pad 40 to inhibit the growth of bacteria and other microbes in the liquid purge. Likewise, a $CO_2$ generation system may be added as an active agent in absorbent pad 40 to regenerate $CO_2$ levels that are favorable to food preservation. Oxygen scavengers can also be used with carbon monoxide (CO), which binds with hemoglobin rapidly and enhances red color ("bloom") in red meats. The system allows for CO generators as well as CO scavengers, as the prolonged presence of CO is undesirable after the food product has achieved "bloom."

Referring to FIG. 5, absorbent pad 50 has a top layer 52 and a bottom layer 54 that are separated by two or more absorbent tissue layers 56. Each tissue layer 56 itself can be formed of one or more tissues that are joined together to form the tissue layer. A food product would be placed in contact with top layer 52, and uptake of liquid purge from the food product is through bottom layer 54. Superabsorbent material 59 can also act a barrier so that all active agents remain in absorbent pad 50. Active agent 57 is one or more oxygen scavengers deposited between two tissue layers 56. Examples of oxygen scavengers are provided above. Absorbent pad 50 can be used to enhance food preservation of any food product stored in a consumer food storage container, but the pad architecture and use of $O_2$ scavengers is suitable to reduce an off-odor, sometimes called "confinement odor," that can occur with poultry and seafood when initially opening the container.

Top layer 52 can be a film, such as polyethylene, polypropylene, polyester, or a non-woven material, and, in this exemplary embodiment, is polyethylene. Bottom layer 54 can be a non-woven material or a film, and in this exemplary embodiment, is a non-woven material. A superabsorbent material 59 can be placed between bottom layer 54 and the first tissue layer 56 to retain moisture and prevent migration of purge or active agents.

Although not illustrated in the present drawings, top layers 42 and 52, respectively, that contact the food product, can be perforated to allow faster uptake of liquid into the pocket containing active agents and, in conjunction with purge absorbed through the bottom layers 44 and 54, respectively, activate the oxygen scavengers and/or other active agents more rapidly.

Figure 6:
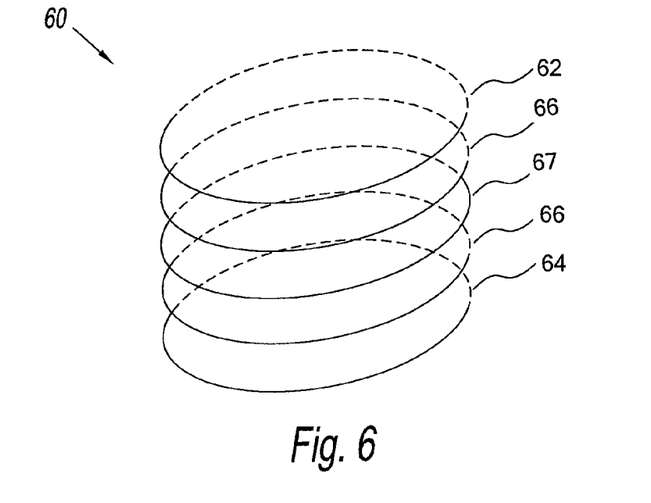
FIG. 6 is an illustration of pad architecture of another exemplary embodiment of an absorbent pad of the present disclosure.

Referring to FIG. 6, absorbent pad 60 has a top layer 62 and a bottom layer 64 that are separated by two or more absorbent tissue layers 66. Each tissue layer 66 can be formed of one or more tissues that are joined together to form the tissue layer. Absorbent pad 60 can be used to preserve any type of food, and is well-suited for preservation of fruits, such as pomegranate arils. As shown in FIG. 6, absorbent pad 60 can be round-shaped to fit directly into the bottom of bowls or other similarly-shaped containers. The food product would be placed in contact with top layer 62, and uptake of liquid purge exuded from the food product is through bottom layer 64. Absorbent pads 60 can also have perforations in top layer 62 (in contact with the fruit). Bottom layer 64 can be made of a non-woven material for increased moisture uptake. Between two tissue layers 66 that form a pocket is an active agent 67. Active agent 67 is one or more atmosphere modifying agent, such as a $CO_2$ generation system and/or one or more oxygen scavengers.

As an example of an amount of an oxygen scavenger for absorbent pad 60, about one (1) gram of oxygen scavenging chemical can be placed between tissue layers to reduce $O_2$ percentages to optimal levels (about 2%). Oxygen scavengers can reduce oxygen levels by about 30 cc/gram in 24 hours.

Figure 7:
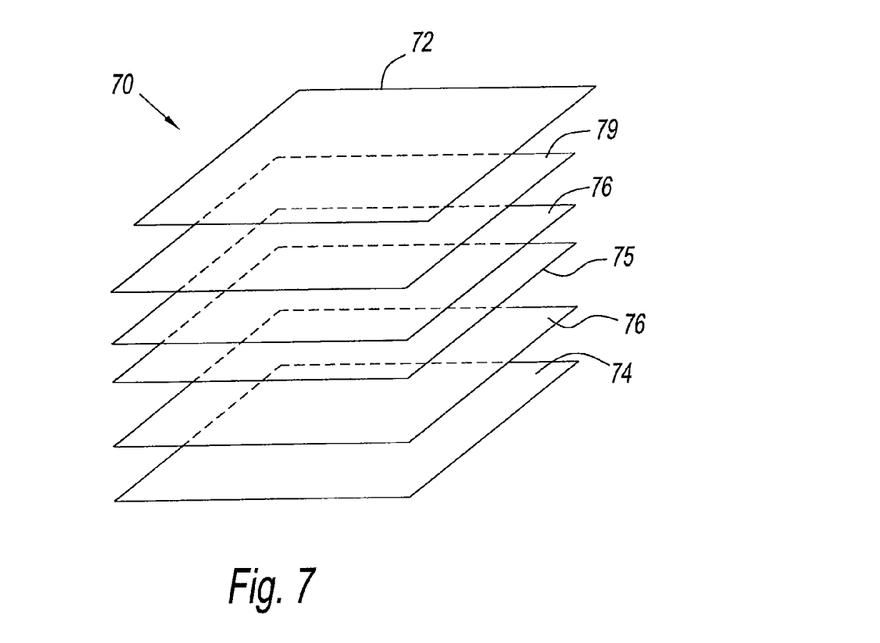
FIG. 7 is an illustration of pad architecture of another exemplary embodiment of an absorbent pad of the present disclosure.

Referring to FIG. 7, absorbent pad 70 has a top layer 72 and a bottom layer 74 that are separated by two or more absorbent tissue layers 76. Each tissue layer 76 can be formed of one or more tissues that are joined together to form the tissue layer. Absorbent pad 70 can be used for any food product, and is well-suited for preserving vegetables. The food product (such as celery) would be placed in contact with top layer 72, and uptake of liquid purge from the food product is through bottom layer 74. Between two tissue layers 76 that form a pocket is an active agent 77 that is one or more atmosphere modifying agent, such as a $CO_2$ generation system and/or one or more oxygen scavengers. For this embodiment, superabsorbent 79 is positioned directly below top layer 72 and above the pocket formed between tissue layers 76, so that active agents 75 are quickly activated and expended. Superabsorbent 79 captures extra moisture or liquid, and effectively retains it inside the pad after the absorbent capacity of absorbent tissue is reached. Absorbent pad 70 generally does not have a perforated top layer 72, so the liquid or moisture passes up through bottom layer 74 and tissue layers 76 before reaching superabsorbent 79.

For the following FIGS. 8 through 12, an absorbent pad that is illustrated can have any of the pad architectures that are illustrated in FIGS. 2 through 7 and described herein.

Figure 8:
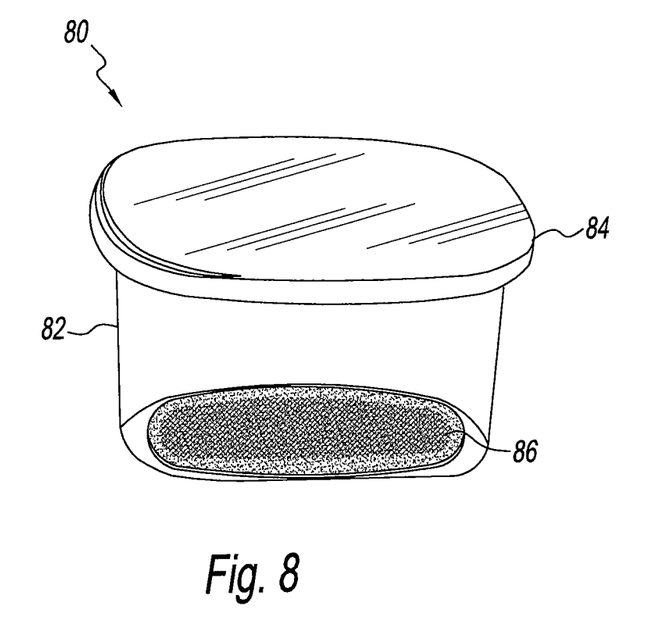
FIG. 8 is a perspective view of an absorbent pad of the present disclosure in a consumer food storage container.

Referring to FIG. 8, there is provided a consumer food storage system generally represented by reference numeral 80. Consumer food storage system 80 has a consumer food storage container 82. Consumer food storage container 82 has a preformed, removable cover 84 that is fitted to the opening of consumer food storage container 82, and can be opened and closed onto the consumer food storage container to permit ingress and egress of food by a consumer. Absorbent pad 86 is in consumer food storage container 82. As shown in this exemplary embodiment, absorbent pad 86 is not secured to consumer food storage container 82. Absorbent pad 86 can be re-used or disposed of after use.

Figure 9:
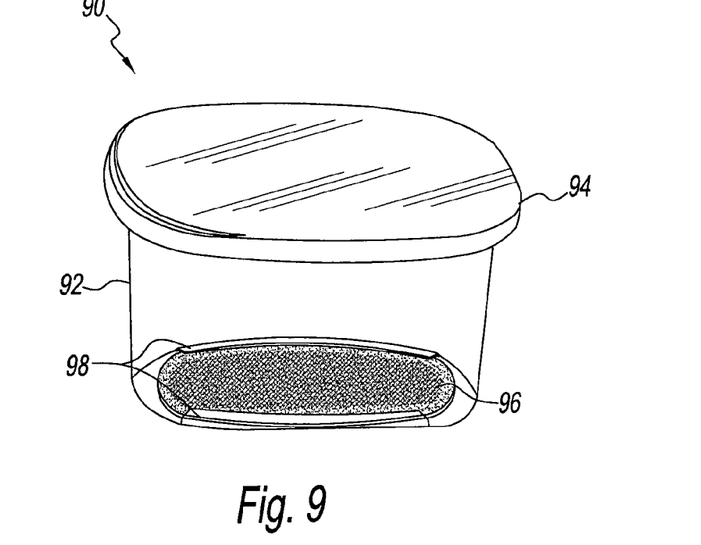
FIG. 9 is a perspective view illustrating an exemplary embodiment of the absorbent pad of FIG. 8, connected by a securing device to a consumer food storage container.

Referring to FIG. 9, an exemplary embodiment of a consumer food storage system 90 is illustrated. Consumer food storage system 90 has consumer food storage container 92. Consumer food storage container 92 has a preformed, removable cover 94 that is fitted to the opening of consumer food storage container 92, and can be opened and closed to permit ingress and egress of food by a consumer. Absorbent pad 96 is in consumer food storage container 92. In this embodiment, absorbent pad 96 is secured to consumer food storage container 92 by one or more securing device 98. One or more securing device 98 includes, but is not limited to, rail, hook, latch, hook-and-eye (such as VELCRO®), and/or an adhering material, which may be any adherent or bonding agent, including, but not limited to, glues, epoxies, and/or cements, and any combinations thereof. One or more securing device 98 secures absorbent pad 96 in consumer food storage container 92, yet permits easy removal of absorbent pad 96 when the absorbent pad is to be disposed or re-used in another container.

Figure 10:
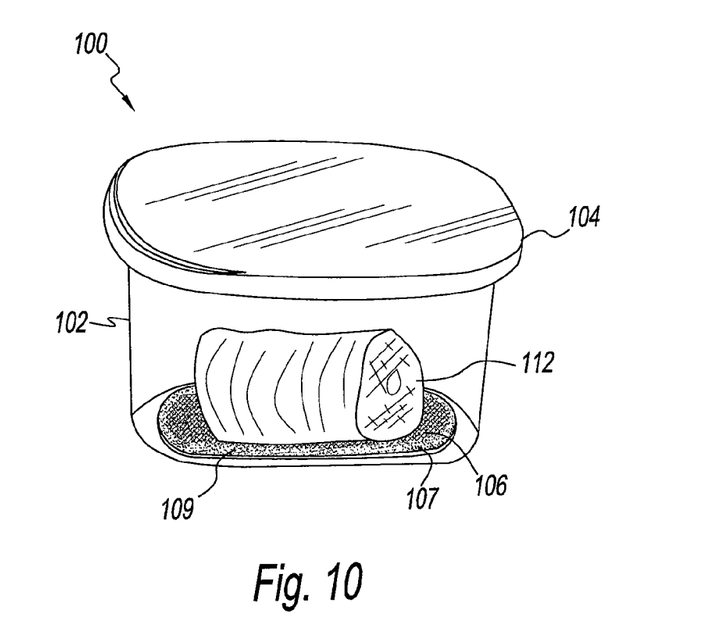
FIG. 10 is a perspective view of an exemplary embodiment of the absorbent pad of FIG. 8, and having a food product therein.

Referring to FIG. 10, there is provided an embodiment of a consumer food storage system generally represented by reference numeral 100. Consumer food storage system 100 has a consumer food storage container 102. Consumer food storage container 102 has a preformed, removable cover 104 that is fitted to the opening of consumer food storage container 102, and can be opened and closed to permit ingress and egress of food. Absorbent pad 106 is in consumer food storage container 102. Absorbent pad 106 can be re-used or disposed of after use. Consumer food storage container 102 is a sealable structure that completely encloses a food product 112 placed therein, and permits ingress and egress of food product 112 by opening and closing removable cover 104 onto consumer food storage container 102.

Consumer food storage container 102 is a rigid structure having a base or bottom, side walls that form an opening, and a preformed cover 104 that is fitted to the opening of consumer food storage container 102. Consumer food storage container 102 may be made of material such as plastic, plastic composites, rubber, aluminum, glass, and/or stainless steel. An example of a consumer food storage container 102 is a Tupperware® container (Tupperware® is a registered mark of Dart Industries, Orlando, Fla., USA). Consumer food storage container 102 has a sufficiently large interior space defined by its base, side walls and cover to be useful for storage of food; that is, sufficiently large to completely enclose food 112 when removable cover 104 is placed onto consumer food storage container 102, yet small enough to fit within a refrigeration unit and/or food storage bin. As used herein, "refrigeration unit" includes any type of cooling device into which food may be placed, such as refrigerators, freezers, coolers and ice chests, as well as any food storage drawers therein, including a refrigerator crisper drawer.

Active agents in pad 106 include one or more antimicrobial agent 107, one or more atmosphere modification system 109, and any combinations thereof. U.S. patent application Ser. No. 11/335,373, published as US Patent Application No. 2006/0172048, describes absorbent pads having active agents, and is incorporated herein by reference. Antimicrobial agent 107 in absorbent pad 106 may be selected from the group consisting of one or more bacterial inhibitor, fungal inhibitor, viral inhibitor, disinfectant, sanitizer, sterilizer, mildewstat, surfactant, deodorizer, and any combinations thereof. Examples of antimicrobial agent 107 include, but are not limited to, a metal, metal compound, surfactant, organic acid, inorganic acid, quaternary ammonium salt, sulfite, biopolymer, synthetic polymer, chitin, chitosan, nisin, enzymatic system, antioxidant, and any combinations thereof. Atmosphere modification system 109 may be $CO_2$-generating systems, $O_2$-scavenging systems, ethylene scavenging systems, and any combinations thereof. One such $CO_2$-generating system that can be used in the present disclosure includes, but is not limited to, a system with an acid and base (such as citric acid and sodium bicarbonate), that, when reacted together, generate $CO_2$. Suitable $O_2$-scavenging systems that can be used in the present disclosure include, but are not limited to, metal oxidation reactions, enzyme catalyzed oxidation reactions, and any combinations thereof. Examples of ethylene scavenging systems include, but are not limited to, systems using potassium permanganate or activated charcoal.

Absorbent pads of the present disclosure may be shaped to fit the shape of a consumer food storage container. Examples of shapes of absorbent pads include square, rectangular, circular, oval, oblong, polygon, trapezoid, triangle, donut-shaped, cone, rod, and/or any combinations thereof. Co-pending U.S. patent application Ser. No. 10/802,254 discloses absorbent pads of various shapes that can be used in the present disclosure, and is incorporated herein by reference.

Figure 11:
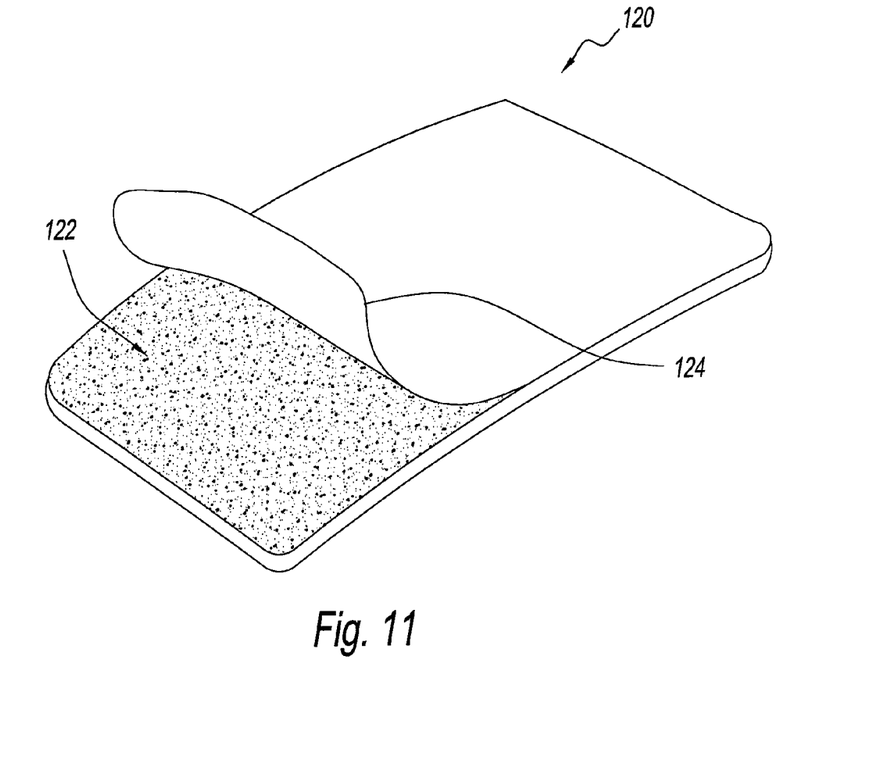
FIG. 11 is a bottom view of an embodiment of an absorbent pad of the present disclosure.

FIG. 11 is an exemplary embodiment of absorbent pad 120 where securing means 122 is an adhesive material connected to absorbent pad 120. Covering sheet 124 protects securing means 122 before use, and can be peeled off when absorbent pad 120 is placed in a consumer food storage container. After covering sheet 124 is removed, adhesive material remains connected to absorbent pad 120. Absorbent pad 120 is then positioned by a consumer somewhere along an inside surface of the consumer food storage container, and pressed thereto so that the adhesive material removably bonds with an interior surface of the food storage container. After use, absorbent pad 120 may be removed from the consumer food storage container and disposed of, or re-used.

Figure 12:
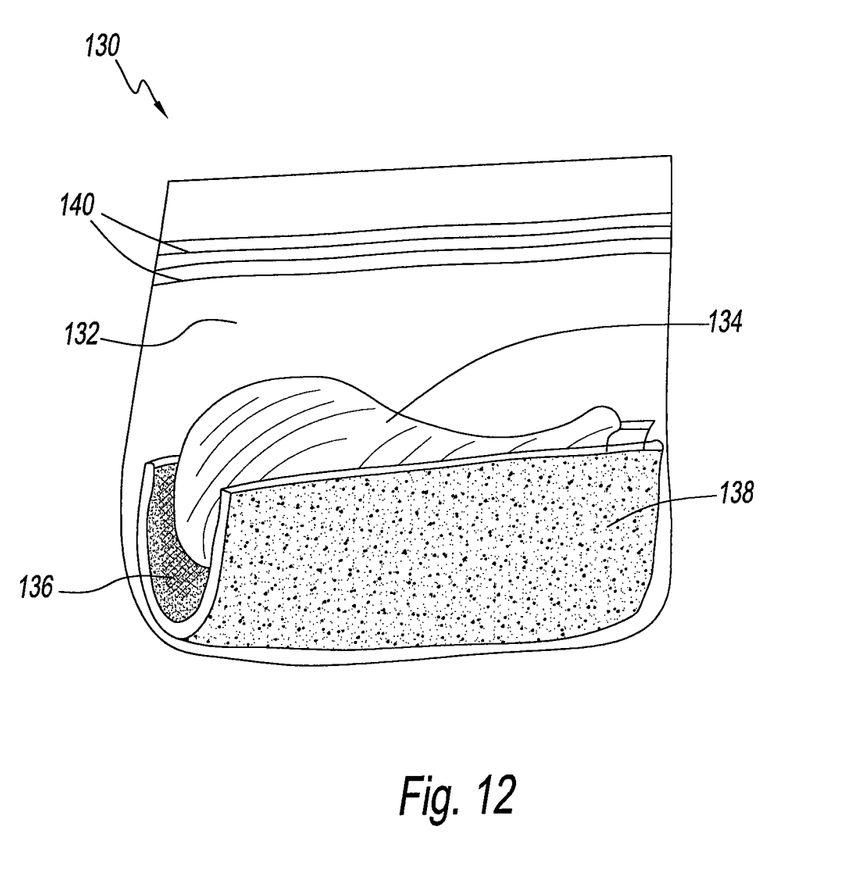
FIG. 12 is a perspective view of an embodiment of a consumer food storage container that is a sealable flexible plastic bag.

FIG. 12 illustrates an exemplary embodiment of a consumer food storage system 130 having a consumer food storage container 132 that is a flexible plastic bag. An example of a flexible plastic bag is a GLAD® food storage bag (GLAD® is a registered mark of Glad Products Company, Oakland, Calif., USA). When closed, consumer food storage container 132 completely encloses food product 134. Absorbent pad 136 can be placed in consumer food storage container 132 without being connected to the container (not shown), or may be secured inside the container by an adhesive material 138 located on any surface of absorbent pad 136. Consumer food storage container 132 has a sealing device, shown as sealing strips 140, that extend across part or all of the opening of consumer food storage container 132 to permit the flexible plastic bag to be opened and closed by the consumer as needed to permit ingress and egress of food without breaking the consumer food storage container 132. Absorbent pad 136 is flexible and is able to conform to the shape of consumer food storage container 132.

A method of using an absorbent pad having an active agent that is structured for use in a consumer food storage container, refrigerator, food drawer, or food storage bin, by placing an absorbent pad of the present disclosure in a consumer food storage container, is provided herein.

The method may include: opening a consumer food storage container having a base, side walls forming an opening, and a preformed removable cover fitted to the opening; positioning an absorbent pad having an active agent within the consumer food storage container; placing a food product inside of the consumer food storage container; and closing the consumer food storage container by replacing the removable cover onto the consumer food storage container, to preserve the freshness of food, enhance food safety and appearance, and reduce food wastage.

The method may further include: opening and closing the cover multiple times to permit ingress and egress of food, without breaking either the cover or the consumer food storage container; regenerating the environment within the consumer food storage container by active agents in the architecture of the absorbent pad; removably connecting the absorbent pad to the consumer food storage container by an adhesive material or other securing device. Where the securing device is an adhesive material, the method may further include removing a covering sheet from the securing device before placing the absorbent pad within a consumer food storage container.

Where the consumer food storage container is a flexible plastic bag (as illustrated in FIG. 12), the method of using an absorbent pad of the present disclosure may include: positioning an absorbent pad within a consumer food storage container; placing a food product within the consumer food storage container; re-sealing the consumer food storage container by closing a sealing device across the opening of a flexible consumer food storage container, to preserve freshness of a food product, enhance food safety and appearance, and reduce food wastage.

The method may further include: opening and closing the sealing devices multiple times to permit ingress and egress of food; regenerating the environment within the flexible consumer food storage container by active agents in the architecture of the absorbent pad; removably connecting the absorbent pad to the consumer food storage container by a securing device. Where the securing device is an adhesive material, the method may further include removing a covering sheet from the securing device before placing the absorbent pad within the consumer food storage container.

The absorbent pad of the present disclosure has the additional benefit that, when placed in a consumer food storage container that is removed from a refrigerator or freezer, the fluid exuded by the thawing food activates the active agents within the architecture of the absorbent pad, resulting in an additional burst of activity of the active agent that preserves the freshness of the food product, enhances food safety and appearance, and reduces food wastage.

The absorbent pad of the present disclosure may also be used to preserve the freshness of non-edible merchandise, such as fresh flowers, in the same way as disclosed above for preserving freshness of a food product.

Also provided is a kit for a consumer food storage system including: a consumer food storage container having a removable, preformed cover (or sealing strips, for such consumer food storage containers that are flexible plastic bags); an absorbent pad having one or more active agent and absorbent layers in a pad architecture configured for a consumer food storage container; and a moisture-resistant case to prevent contamination and prevent ambient moisture from being absorbed by the absorbent pad before use. The consumer food storage container in the kit may further comprise a securing device for the absorbent pad.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances that fall within the scope of the appended claims.

What is claimed is:

1. A food package comprising:
    a consumer food storage container, the container comprising:
        a bottom;
        side walls connected to the bottom to form a top opening; and
        a preformed cover removably fitted to the top opening, wherein the cover can be opened and re-closed by a consumer;
    an absorbent pad for the container, the absorbent pad comprising:
        a body having an architecture comprising in the following order from top to bottom:
            a top layer;
            a first tissue layer, wherein the top layer is separate from the first tissue layer;
            a second tissue layer, wherein the second tissue layer is separate from the first tissue layer;
            a third tissue layer, wherein the third tissue layer is separate from the second tissue layer;
            a fourth tissue layer, wherein the fourth tissue layer is separate from the third tissue layer; and
            a bottom layer, wherein the bottom layer is separate from the fourth tissue layer;
        wherein the first and second tissue layers form a first pocket, and
        wherein the third and fourth tissue layers form a second pocket, wherein the first, second, third and fourth tissue layers and, thus, the first and second pockets, are separate from the top and bottom layers, and wherein the first and second pockets have an active agent therein; and
    a superabsorbent material or membrane disposed between the second and third tissue layers, wherein the superabsorbent material or membrane delays activation of the active agent in the first pocket with respect to activation of the liquid-activated active agent in the second pocket;
    wherein the active agent in the first pocket comprises an antimicrobial and an atmosphere modifier, wherein the atmosphere modifier is selected from a group consisting of: a $CO_2$ generator, an $O_2$ scavenger, an ethylene scavenger, and any combinations thereof, and wherein the active agent in the first pocket and in the second pocket is liquid-activated,
    wherein the architecture of the absorbent pad and placement of the active agent in relation to the absorbent layer are structured so that a portion of the atmosphere modifier generates a modified atmosphere in the container when activated by a liquid, and
    wherein the active agent has an unexpended portion that regenerates the modified atmosphere in the container once the cover has been opened and re-closed.

2. The food package according to claim 1, further comprising a superabsorbent material or membrane positioned between the top layer and the first tissue layer.

3. The food package according to claim 1, wherein the active agent in the first pocket is either an acid or a base component of the $CO_2$ generator.

4. The food package according to claim 1, wherein the active agent in the second pocket is selected from the group consisting of: an antimicrobial, a $CO_2$ generator, an $O_2$ scavenger, and ethylene scavenger, and any combinations thereof.

5. The food package according to claim 1, wherein the $CO_2$ generator comprises citric acid and sodium bicarbonate.

6. The food package according to claim 1, wherein the antimicrobial is selected from the group consisting of: citric acid, sorbic acid, lactic acid, and any combinations thereof.

7. The food package according to claim 1, wherein the consumer food storage container defines an enclosed, controlled environment that prevents passage of normal atmospheric air in the consumer food storage container, but selectively provides access to the enclosed environment.

8. The food package according to claim 1, wherein the consumer food storage container is a rigid container with removable preformed cover.

9. The food package according to claim 1, further comprising:
    a food product, wherein the food product is in direct contact with the top layer of the body of the absorbent pad after the cover is removed, and
    wherein the food product is completely enclosed by the consumer food storage container when the cover is re-closed by the consumer.

10. A consumer food storage package comprising:
    a flexible plastic consumer food storage container having a sealing device that can be opened and closed to permit ingress and egress in the container; and
    an absorbent pad comprising:
        a body having an architecture comprising in the following order from top to bottom:
            a top layer;
            a first tissue layer adjacent the top layer, wherein the top layer is separate from the first tissue layer;
            a second tissue layer adjacent the bottom layer, wherein the second tissue layer is separate from the first tissue layer;
            a third tissue layer, wherein the third tissue layer is separate from the second tissue layer;

a fourth tissue layer, wherein the fourth tissue layer is separate from the third tissue layer; and a bottom layer, wherein the bottom layer is separate from the fourth tissue layer;

wherein the first and second tissue layers form a first pocket, wherein the third and fourth tissue layers form a second pocket, wherein the first, second, third and fourth tissue layers and, thus, the first and second pockets, are separate from the top and bottom layers, and wherein the first and second pockets have an active agent therein; and a superabsorbent material or membrane disposed between the second and third tissue layers, wherein the superabsorbent material or membrane delays activation of the active agent in the first pocket with respect to activation of the liquid-activated active agent in the second pocket, wherein the active agent in the first pocket is selected from the group consisting of: an antimicrobial, a $CO_2$ generator, an oxygen scavenger, an ethylene scavenger, and any combinations thereof, and wherein the active agent in the first pocket and in the second pocket is liquid-activated.

11. A method for preserving freshness of a food in a consumer food storage container, comprising:

opening a consumer food storage container, wherein the consumer food storage container comprises:

a rigid structure with a bottom, side walls to form an opening, and a removable preformed cover fitted to the opening, wherein the consumer food storage container and the cover completely enclose a food placed therein when the cover is placed on the opening of the consumer food storage container;

placing an absorbent pad and the food in the consumer food storage container, wherein the absorbent pad comprises:

a body having an architecture comprising in the following order from top to bottom:

a top layer for contact with the food when the food is placed on the absorbent pad;

a first tissue layer positioned adjacent the top layer, wherein the top layer is separate from the first tissue layer;

a second tissue layer positioned adjacent the bottom layer, wherein the second tissue layer is separate from the first tissue layer;

a third tissue layer, wherein the third tissue layer is separate from the second tissue layer;

a fourth tissue layer, wherein the fourth tissue layer is separate from the third tissue layer; and a bottom layer, wherein the bottom layer is separate from the fourth tissue layer;

wherein the first and second tissue layers form a first pocket;

wherein the third and fourth tissue layers form a second pocket, wherein the first, second, third and fourth tissue layers and, thus, the first and second pockets, are separate from the top and bottom layers, and wherein the first and second pockets have an active agent therein; and a superabsorbent material or membrane disposed between the second and third tissue layers, wherein the superabsorbent material or membrane delays activation of the active agent in the first pocket with respect to activation of the liquid-activated active agent in the second pocket;

wherein the active agent in the first pocket comprises an antimicrobial and an atmosphere modifier, wherein the atmosphere modifier is selected from a group consisting of: a $CO_2$ generator, an $O_2$ scavenger, an ethylene scavenger, and any combinations thereof, and wherein the active agent in the first pocket and in the second pocket is liquid-activated, and wherein the architecture is structured so that the atmosphere modifier generates an environment to preserve freshness of a food placed in the consumer food storage container, and closing the consumer food storage container by replacing the cover onto the container, wherein the cover can be re-opened and re-closed to permit ingress and egress of food from the consumer food storage container.

* * * * *